US00RE42760E

(19) United States
(12) Reissued Patent
Kuo

(10) Patent Number: US RE42,760 E
(45) Date of Reissued Patent: Sep. 27, 2011

(54) PROCESS AND METHOD FOR SECURE ONLINE TRANSACTIONS WITH CALCULATED RISK AND AGAINST FRAUD

(75) Inventor: James Shaw-Han Kuo, Piedmont, CA (US)

(73) Assignee: Online Security Portfolio LLC, Cupertino, CA (US)

(21) Appl. No.: 12/503,008

(22) Filed: Jul. 14, 2009

Related U.S. Patent Documents

Reissue of:
(64) Patent No.: 6,847,953
Issued: Jan. 25, 2005
Appl. No.: 09/497,665
Filed: Feb. 4, 2000

(51) Int. Cl.
*G06Q 20/00* (2006.01)

(52) U.S. Cl. ..... 705/75; 705/1; 705/50; 705/64; 705/67; 705/78; 705/53

(58) Field of Classification Search ..... 705/26, 705/50–79
See application file for complete search history.

(56) References Cited

U.S. PATENT DOCUMENTS 5,710,887 A 1/1998 Chelliah et al.
5,715,314 A 2/1998 Payne et al.
5,715,399 A 2/1998 Bezos (Continued)

FOREIGN PATENT DOCUMENTS

JP 10240814 A * 9/1998

OTHER PUBLICATIONS

Menezes et al., "Handbook of Applied Cryptography", CRC Press LLC, 1997.*

(Continued)

*Primary Examiner* — Andrew J. Fischer
*Assistant Examiner* — Chrystina Zelaskiewicz
(74) *Attorney, Agent, or Firm* — Edward P. Heller, III

(57) ABSTRACT

An electronic commerce process that facilitates online transactions among multiple participants, that prevents consumer fraud due to pirated payment card numbers, with calculated risk, involving at least one trusted payment card host (3), where buyer's payment card number is registered and corresponding secret keys are set up. The buyer (1b) initiates an online transaction by selecting a host from a list of hosts that served by the seller's web server (2a). Then, the buyer participant (1a) sends an order online (4), SSL encrypted. The seller participant (2a) receives and decrypts the order, confirms the availability of ordered items, assigns an orderID to the order, and sends a response (5a), SSL encrypted, to the buyer participant (1a) with the assigned orderID. The buyer participant (1a) encrypts and notifies the selected host (3) of this order and orderID, and authorizes the payment (6a) using secret keys. At the same time, the seller participant also encrypts and sends payment approval request (7) for this orderID through the host. The host (3) decrypts and matches up the orderID, retrieves the secret keys, and hashes to obtain the corresponding payment card number. The host then encrypts and send for payment authorization (8a) from the payment card issuer with the payment card number, through payment clearing network. Upon receiving and decrypting the response (9) back from the payment card issuer, the host (3) encrypts and notifies (10a) the seller participant (2a) of the card issuer's response (9) for the orderID. After fulfilling the order (11,12), the seller participant encrypts and sends for payment capturing (13a) for this order with orderID, through the host and payment network (14a,15,16).

24 Claims, 1 Drawing Sheet

U.S. PATENT DOCUMENTS

| | | | | |
|---|---|---|---|---|
| 5,727,165 | A | 3/1998 | Ordish et al. | |
| 5,790,677 | A | 8/1998 | Fox | |
| 5,794,207 | A | 8/1998 | Walker et al. | |
| 5,826,241 | A | 10/1998 | Stein et al. | |
| 5,883,810 | A * | 3/1999 | Franklin et al. | 700/232 |
| 5,903,721 | A | 5/1999 | Sixtus | |
| 5,903,878 | A * | 5/1999 | Talati et al. | 705/26.41 |
| 5,956,699 | A | 9/1999 | Wong et al. | |
| 6,000,832 | A | 12/1999 | Franklin | |
| 6,014,635 | A | 1/2000 | Harris | |
| 6,041,123 | A | 3/2000 | Colvin, Sr. | |
| 6,047,268 | A | 4/2000 | Bartoli et al. | |
| 6,188,994 | B1 | 2/2001 | Egendorf | |
| 6,205,437 | B1 | 3/2001 | Gifford | |
| 6,327,578 | B1 | 12/2001 | Linehan | |
| 6,332,134 | B1 * | 12/2001 | Foster | 705/36 R |
| 6,847,953 | B2 | 1/2005 | Kuo | |
| 7,003,789 | B1 | 2/2006 | Linehan | |
| 2002/0091652 | A1 | 7/2002 | Nagahara | |
| 2002/0154163 | A1 | 10/2002 | Melchner | |
| 2002/0174064 | A1 | 11/2002 | Li | |
| 2003/0120554 | A1 | 6/2003 | Hogan et al. | |
| 2003/0120615 | A1 | 6/2003 | Kuo | |
| 2004/0054632 | A1 | 3/2004 | Remy | |
| 2004/0153378 | A1 | 8/2004 | Perkowski | |
| 2004/0249726 | A1 | 12/2004 | Linehan | |
| 2005/0027543 | A1 | 2/2005 | Labrou et al. | |
| 2005/0240472 | A1 | 10/2005 | Postrel | |
| 2005/0240522 | A1 | 10/2005 | Kranzley et al. | |
| 2006/0059055 | A1 | 3/2006 | Lin | |
| 2007/0005445 | A1 * | 1/2007 | Casper | 705/26 |
| 2007/0102510 | A1 | 5/2007 | Beemer et al. | |
| 2007/0244831 | A1 | 10/2007 | Kuo | |

OTHER PUBLICATIONS

Klemow, Jason, "Credit Card Transactions via the Internet," TMA Journal, vol. 19n1, pp. 10-14 Jan./Feb. 1999.

Final Office Action dated Jul. 9, 2009 for U.S. Appl. No. 11/736,876, filed Apr. 18, 2007.

Office Action dated Feb. 5, 2009 for U.S. Appl. No. 11/736,876, filed Apr. 18, 2007.

Restriction Action dated Sep. 9, 2008 for U.S. Appl. No. 11/736,876, filed Apr. 18, 2007.

PCT International Search Report and Written Opinion for PCT/US07/66884, dated Jan. 7, 2008.

Office Action dated Jun. 10, 2002 for U.S. Appl. No. 09/497,665, filed Feb. 4, 2000.

Amendment dated Sep. 3, 2002 for U.S. Appl. No. 09/497,665, filed Feb. 4, 2000.

Notice of Non-Compliant Amendment dated Sep. 16, 2002 for U.S. Appl. No. 09/497,665, filed Feb. 4, 2000.

Amendment dated Oct. 4, 2002 for U.S. Appl. No. 09/497,665, filed Feb. 4, 2000.

Final Office Action dated Nov. 5, 2002 for U.S. Appl. No. 09/497,665, filed Feb. 4, 2000.

Response to Final Office Action dated Feb. 5, 2003 for U.S. Appl. No. 09/497,665, filed Feb. 4, 2000.

Advisory Action dated Feb. 20, 2003 for U.S. Appl. No. 09/497,665, filed Feb. 4, 2000.

CPA and Preliminary Amendment dated Mar. 5, 2003 for U.S. Appl. No. 09/497,665, filed Feb. 4, 2000.

Supplementary Preliminary Amendment dated Mar. 19, 2003 for U.S. Appl. No. 09/497,665, filed Feb. 4, 2000.

Notice of Allowance dated Jul. 2, 2004 for U.S. Appl. No. 09/497,665, filed Feb. 4, 2000.

Klemow, Jason, "Credit card transactions via the internet", TMA Journal v19n1 pp. 10-14 Jan./Feb. 1999.*

International search report for PCT/US 01/03628, dated May 8, 2001, from US Patent Office.

* cited by examiner

PROCESS AND METHOD FOR SECURE ONLINE TRANSACTIONS WITH CALCULATED RISK AND AGAINST FRAUD

Matter enclosed in heavy brackets [ ] appears in the original patent but forms no part of this reissue specification; matter printed in italics indicates the additions made by reissue.

CROSS-REFERENCE TO RELATED APPLICATIONS

Not applicable.

GOVERNMENT SPONSORSHIP

Not applicable.

MICROFICHE APPENDIX

Not applicable.

BACKGROUND

1. Field of Invention

This invention relates to online transactions that take place in electronic commerce. Specifically, this invention relates to process and method for online transactions that is relatively secure, and most importantly, it alleviates online consumer fraud that originates from pirated credit card numbers, which often occurred from offline sources.

BACKGROUND

2. Description of Prior Art

With advent of electronic commerce, or ecommerce, the internet has brought the world together as a global trading market. Consumer at any corner of the world can buy products or services from any merchant at other parts of the world, as long as the consumer can have access to the internet and the merchant has set up a web store front. The volume of this electronic online trading is apparently huge and its growth can be explosive. What usually takes place is that, when a consumer shop at a merchant's online store, after placing an order online, the consumer will also need to enter payment information online at the same time, which is normally done by filling out a payment form that requires payment card number and certain payment card supporting information.

When merchant received the order from the consumer with payment information, the merchant will then try to fulfill the order and send in payment request to a private payment card clearing network through a payment gateway. Once the merchant received the payment request response, that is payment authorization, from the payment gateway, the merchant will then deliver what the consumer ordered, and send in the request for payment capture.

This online transaction starts when the consumer entered the order with payment information, and completed when the merchant fulfilled the order and captured payment. A potential fraudulent online transaction occurs when the credit card, or payment card, that used to pay for the orders online was pirated, often from off line sources. Because of the wide spread, global reach that internet enables, the potential damages to the online trading due to pirated payment cards, compared to damages it can cause to offline trading, or the traditional, old style commerce, can be many times over.

With enabling internet technologies and cryptographics algorithms today, a number of online transaction systems were proposed or developed, with varying degrees of security measures against fraud.

SET, Secure Electronic Transaction, a widely recognized, highly secure protocol for ecommerce, was first proposed by VISA, MASTERCARD, and other financial institutions in 1997[1]. Its sophisticated technological requirement has not met with wide spread deployment. Its failure in wide spread deployment should not be regarded as low acceptance among ecommerce population with respect to the importance of electronic transaction security. Rather, people have opted for other electronic transaction models that are a lot easier for merchants to deploy and for consumers to use. That is, a user friendly, risk tolerate transaction model, which can operate without technological sophistication of the digital certificates. Set up and operate with digital certificates can be intimidating for technology novice consumers.

These popular electronic payment transaction models, also known to be of the class of online payment with SSL-security, though user friendly, are severely compromised that they are incapable of effectively dealing with pirated payment cards, which often came from offline sources. This shortcoming is particularly pronounced when online transaction takes place for immediate download of products or services from the merchant's web sites, where Address Verification System (AVS) is normally not applicable.

To address this shortcoming, many alternative approaches have been proposed. Notably, Bartoli et al., U.S. Pat. No. 6,047,268, Linehan, U.S. Pat. No. 6,327,578, and others. Although online billing and online payment are different in scope, Bartoli et al. presented an interesting billing process that is noteworthy. Bartoli et al. teach a billing system that will automatically authenticate the user using "cookie" file which includes explicit user account number and authentication data, bills the user directly and then settles payment with the merchant directly. Both user and merchant must register at the same billing system, that is, both user and merchant must set up direct financial relationship with the same billing system, including the credit line limit that the billing system gives to each user,in order to make this payment process work. Its advantage is that user does not need to install client software, except for a cookie file, and user can stay anonymous with respect to the merchant. But, as the number of users and merchants increase, and each registers at their own billing system, the number of registrations that a user or a merchant need to do to establish direct financial relationships with different billing systems in order to be able to carry out transactions among potential users and merchants will be overwhelming, it seems to try to replace the current payment network, instead of taking advantage of it. The current payment network has been tried for many decades and any error or downtime is extremely costly. In addition, it routes authorization token through client machine which will risk potential fraud from malicious user as man-in-the-middle or risk fraudulent page re-direct.

Linehan, on the other hand, discloses a method that involves "thin" consumer wallet that communicates directly with issuer via issuer gateway. The wallet provides functions such as authenticating the consumer to the issuer gateway, to timeout payment request and to retry payment request. The issuer gateway act on behalf of the issuer, is equivalent to the "store front" presence of the issuer on the open internet. This payment protocol has many advantages over the SET, such as avoid usage of consumer digital certificate, separate authentication technology between the consumer and issuing bank from the rest of the payment protocol, etc. But, requiring a consumer wallet in order to process a transaction could prove to be quite inconvenient for a consumer who wants to carry out transactions on many different machines at many different locations, such as at office, at home, or at airport, because that consumer wallet installed on consumer's machine is limited in terms of portability. In addition, the installation of the wallet client software on consumer's machine can be quite challenging to a novice consumer, especially if many issuers are involved that makes the wallet authentication mechanism overly complicated. Also, since an issuer gateway has implied direct relationship with the issuer, a consumer does not have a choice of which issuer gateway to go to, once he or she has decided which payment card he or she wants to use to pay for the order. Specifically, a consumer cannot go to an American Express Card issuer gateway because of its good service, while he or she wants to use a payment card of other issuer (BankOne Visa or MasterCard, etc.) because of a favorable interest rate. This protocol inter-connects complex relationships among issuers and acquirers, ultimately, it's like to rebuild the function that current backend banking network does, instead of taking full advantage of it. Any alteration inside the existing backend banking network will be very costly, as it cannot tolerate any error or downtime. And, as also pointed out by Linehan, this protocol routes payment messages through consumer's machine, and should implement "replay detection", that is, to detect potential fraudulent page-redirect, which no current algorithm can do effectively.

A useful and desirable electronic payment transaction method or protocol should be user friendly, can be deployed easily and cost effectively, comply with and take advantage of existing payment infrastructure, and at the same time, provides a sound measure against fraud, which often arise from pirated payment card numbers.

SUMMARY

In an electronic commerce online transaction that prevent consumer fraud due to pirated payment card numbers, this invention involving at least one trusted payment card host. Buyer selects host, and enters order online without sending payment card number. Seller assigns an orderID to the order. Buyer authorizes payment through the host using secret keys; seller also request payment approval through the host with the same orderID. The host matches orderID and recover secret keys. The host hashes with the set of secret keys to get payment card number. The host then send payment authorization request to the payment card issuer via payment network. After receiving the response from the issuer, the host sends issuer's response back to the seller. Seller fulfills the order and send for payment capturing through the host. All messages sending and passing over the internet are SSL channel encrypted, and all messages received are decrypted by recipients.

OBJECTS AND ADVANTAGES

The objects and advantages that this invention achieved are as follows:

(1) No payment card number is used by consumers in this online transaction process, when the consumers enter orders online. Therefore, any pirated payment card, mostly from offline sources, is rendered useless when a consumer is trying to use the pirated payment card number to order or shop online.

(2) It, from objects and advantages (1), provides a way to effectively combat consumer fraud, due to pirated payment card numbers, that originates mostly from offline (3) Merchants do not handle consumer's payment card numbers in this online transaction process, it alleviates payment card abuse by fraudulent web merchants or potential dishonest employees of online merchants.

(4) It complements the existing electronic commerce practices, such as interface to internet payment gateways, or payment card clearing network, the backend payment card processors.

(5) It does not restrict the device type that consumer can use to engage in online transactions, as long as the device is equipped with a web browser and plug-in ecommerce software.

(6) It does not restrict that over what kind of communication networks or communication protocols it can operate, as long as the Hosts, the Merchant Servers, and the Consumer Browsers are interconnected and can communicate with each other.

(7) It does not deliver payment card numbers over the open, unsecured network such as the internet, thus eliminates eavesdropping of payment card numbers over the internet.

(8) Based on the objects and advantages (7), this online transaction process can relief consumers' fear of shopping online simply because that they are afraid of entering payment card numbers online.

(9) This invention does not rely heavily on cryptographics. With calculated risk, it is easy to use for consumers and easy to deploy for merchants. This process and method is fairly secure with random keys, its security is not unduly compromised.

(10) With increased security measure, this invention allows frequent changes or mutation of each set of secret keys that corresponds to each payment card account, without the need to change the underlined payment card account.

(11) It can confirm to encryption regulations of various government easily, facilitates electronic commerce deployment for global reach.

LIST OF REFERENCE OF NUMERALS

Figure 1:
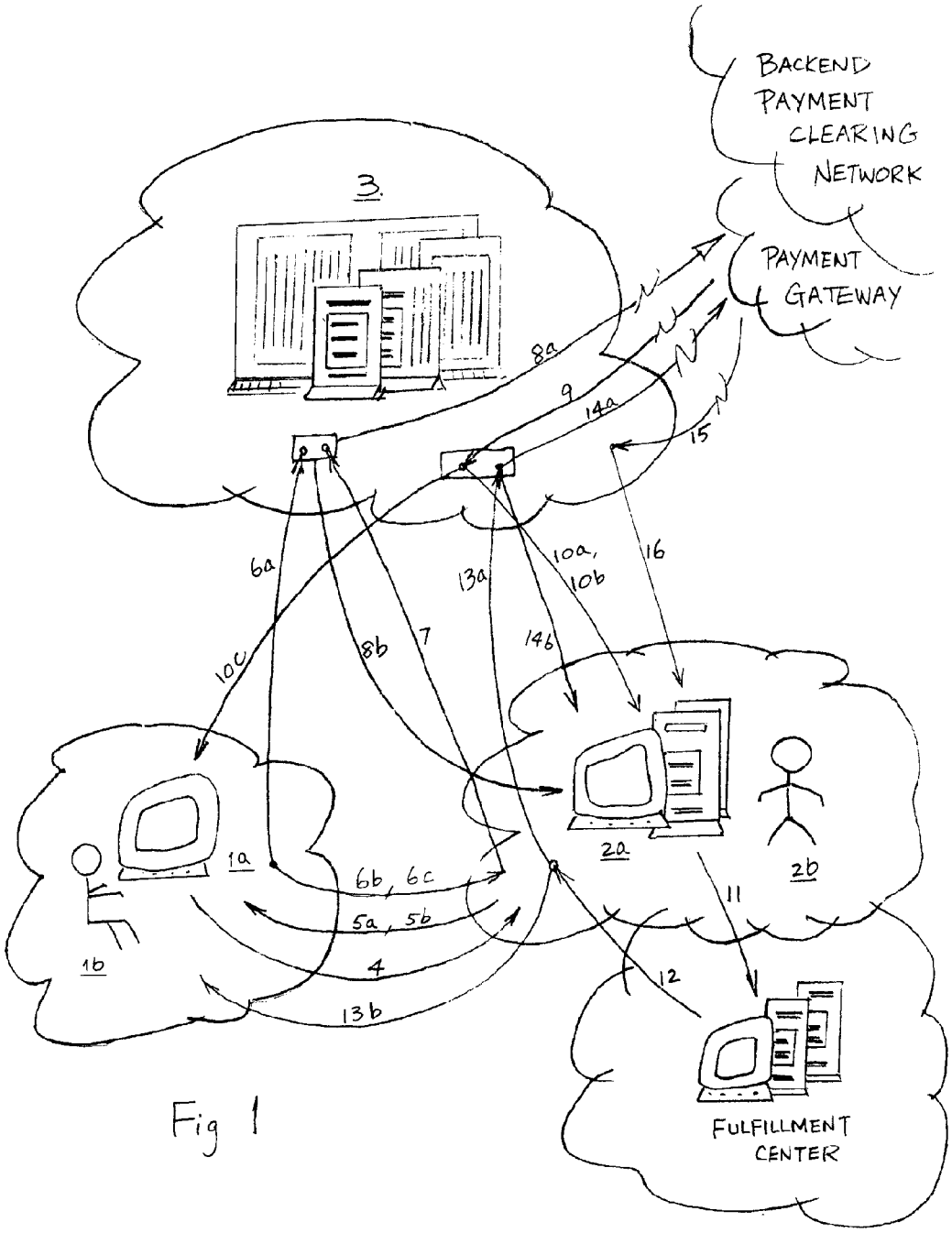
FIG. 1 is a schematic of an online transaction process that takes place in an electronic commerce, from the viewpoint of a participating consumer. The steps of operation flow follows numeral sequence as in this figure, from 4 to 16.

1a consumer participant, or, buyer participant, an ecommerce device, it can be a PC computer, a handheld device, or a TV set that executes ecommerce application software

1b the consumer, or buyer

2a merchant participant, or, seller participant, an ecommerce application server

2b the merchant, or seller

3 the trusted payment card host, or the host

4 consumer selects host and sends orders to the merchant participant online without including payment card number

5a merchant participant sends order accepted response to the consumer participant with orderID

5b merchant participant sends order-not-available response to the consumer participant

6a consumer participant sends payment authorization request to the host with orderID

6b consumer participant sends order-canceled response to the merchant participant

6c consumer participant sends payment-authorization-requested message to the merchant participant

7 merchant participant sends payment approval request to the host with orderID

8a the host matches orderID, sends transaction authorization request through payment gateway, or through payment clearing network

8b the host sends payment-approval-request-rejected response to the merchant participant

9 the host receives transaction-authorization-request response back from payment card issuer, via payment gateway or via payment clearing network

10a the host sends payment-approval-request response to the merchant participant

10b the host sends payment-approval-request-rejected response to the merchant participant

10c the host sends payment-authorization-request response to the consumer participant

11 merchant participant sends fulfillment request to the fulfillment center

12 fulfillment center sends fulfillment-request response back to the merchant participant

13a merchant participant sends payment capturing request to the host

13b merchant participant sends order-fulfilled response message to the consumer participant

14a the host sends transaction clearing request through payment gateway, or, through payment clearing network

14b the host sends payment-capturing-request-refused response back to the merchant participant

15 the host receives transaction-clearing-request response back from payment card issuer, via payment gateway, or, via payment clearing network

16 the host sends payment-capturing-request response to the merchant participant

DESCRIPTION AND OPERATION OF INVENTION-MAIN EMBODIMENT

This invention (FIG. 1) provides a secure, user friendly online transaction model that alleviates consumer fraud which arises from pirated payment cards, and facilitates electronic commerce among unrestricted audience of participants, over an open, unsecured, wide area communication network, such as internet. From a localized viewpoint, that is from a single participating consumer's point of view, this electronic commerce system has a trusted payment card host (Host 3), a computer server at a participating merchant's web site (Merchant Server 2a), and a computer client at the consumer's reach (Consumer Browser 1a).

A Host 3, the trusted payment card host, is a secure computer server or servers, that hosts a repository of consumers' payment cards data. Consumers 1b register their payment cards at a Host, or at various Hosts of their choice, and set up a pair of keys correspond to each payment card with the Host. For security reason, the keys are not stored in pair, but in random orders. Only the unique, correct key pair can hash out their corresponding payment card number. Each key pair, one key being authorization code, the other being authentication code are established by the payment card owner consumer with the Host. They can be changed by the owner consumer 1b at the request of the Host, or by the owner consumer self. They also can be changed at a preset periodical time, or, when deemed necessary.

A Merchant Server 2a is a computer server that merchants used to process purchase orders, and a Consumer Browser 1a is a web browser with software plug-ins that consumers used to participate in online ecommerce. Messages delivered via internet, between a Consumer Browser and a Merchant Server, between a Consumer Browser and a Host, and between a Merchant Server and a Host, are always SSL channel encrypted.

In an active ecommerce, there can be many Hosts, many Merchant Servers, and of course, many consumers, interconnected and spread over the internet, engaging in active electronic commercial transactions.

In a typical commercial transaction session, a consumer 1b initiates the online transaction by sending 4 in an order to a merchant 2b, after the consumer has done the shopping online, reviewed and confirmed the items to order. This order is delivered in a message from the Consumer Browser to the Merchant Server via internet, SSL channel encrypted. In the message, together with ordered items, are the Host of choice and an optional consumer authentication code. The selected Host is the one where the consumer has registered his or her payment card, which the consumer will use to pay for the order. The Host of choice is selected from a dropdown list of Hosts that served from the Merchant Server. This list of Hosts are those entrusted by the merchant 2b. The accompany authentication code corresponds to the payment card, is set up by the consumer at this selected Host 3.

Upon receiving the order, the Merchant Server 2a can check availability of ordered items, and optionally placed hold on those items for future delivery if the transaction is successfully authorized and approved. If the order cannot be fulfilled, an order-not-available response 5b will be generated and sent to the consumer, this transaction is then terminated. If the ordered items are available, in all or in part, Merchant Server will generate an orderID, and tally up the money amount for the order. Merchant Server will then generate an order accepted response 5a. The orderID and the Ordered items to be fulfilled are stored in the Merchant Server's database.

The order accepted response includes the orderID, the Host of choice which came with original order entry, those ordered items that are available, and the money amount. This order accepted response message 5a is constructed and delivered to the consumer via internet, SSL channel encrypted. Consumer Browser receives this response and pop up a window with a payment form to be filled out by the consumer 1b. The window can be another browser window. The fields in the form includes orderID (automatically filled in already), ordered items list (already filled in), money amount (already filled in), Host of choice (already filled in, it's originally specified by consumer), consumer's payment authorization code (to be filled in), consumer authentication code (to be filled in), and other optional fields, with send and cancel buttons. Click on cancel button will abort this transaction, and an order-canceled response 6b message, which includes the orderID, will be generated and sent back to the Merchant Server that terminates this transaction. Else, after consumer filled in the blanks of the form, in accordance with the Host selected, then click on the send button, a payment authorization request 6a is generated and sent to the designated Host, and a payment-authorization-request-sent message 6c, which includes the orderID, is also generated and sent to the Merchant Server.

Upon receiving the payment-authorization-request-sent message, the Merchant Server will then construct a corresponding payment approval request 7 for this orderID, with retrieved relevant data from database of pending orders, and send it off to the selected Host.

The payment approval request 7 includes the orderID, money amount, consumer authentication code if it came with the order, and other supporting information, that are required in order to complete the processing of payment approval request. The supporting information includes merchant's financial institution, merchant ID, merchant address, etc., those data required by payment clearing network, and/or participating financial institutions to ensure that the merchant can and is legitimate to receive payment of the transaction. This payment approval request message is constructed and delivered to the Host 3 of choice, which is specified in the consumer's order entry, via internet, SSL channel encrypted.

Upon receiving Merchant Server's payment approval request, the designated Host 3, who holds the payment card data that the consumer will use to pay for the order, will use the orderID, which is included in the payment approval request, to look up the corresponding payment authorization request 6a which has the same orderID. The Host will search inside the pool of payment authorization requests that were received within a time window around the time that the payment approval request was received. The length of this time window is determined by the Host, to reduce potential fraud, should the payment authorization request has been contaminated. In other words, this time window serves to expire the payment approval request.

If the Host 3 cannot find the payment authorization request 6a with same orderID as the payment approval request 7, within the set time window, the payment approval request is rejected, and a payment-request-rejected 8b response message with the orderID is constructed and sent back to the Merchant Server who requested it. The transaction is thus terminated.

If the Host 3 found the payment authorization request 6a with same orderID as the payment approval request 7, within the set time window, the Host will use the key pair, authorization code and authentication code that included in the payment authorization request 6a, to locate the consumer payment card data, and retrieve the payment card number. The Host will then format a transaction authorization request 8a, using the payment card number and the merchant information contained in the payment approval request 7, and send it to the consumer's payment card issuer through an Internet Payment Gateway, or other payment card clearing network.

Upon receiving the transaction-authorization-request response 9 from consumer's payment card issuer via the payment gateway, the Host 3 will determine if the issuer has approved this transaction request or not. If this request has been rejected, a payment-request-rejected response 10b message, including the orderID and the response from issuer, will be generated and sent back to the Merchant Server who requested it. The transaction is then terminated.

If the issuer approved this transaction request, the Host 3 will generate a transactionID. This transactionID includes the orderID and an approval code from issuer's response. The format of approval code may vary, depends on the payment card type or issuer. The Host stores the issuer's response 9, together with the transaction authorization request 8a under this transactionID temporarily in Host's database, awaiting payment capturing request from the Merchant Server. The length of time before this transactionID record expires is set by the Host, it's usually more accommodating. The Host will then generate a payment-approval-request response message 10a, which includes the transactionID and send it back to the Merchant Server. The Host will also generate a payment-authorization-request 10c response message with the transactionID, and send it back to the consumer via email (since Consumer Browser may not always be up to receive Host's response).

After receiving the payment-approval-request response message 10a from the Host 3, the Merchant Server will store the transactionID in the corresponding orderID record, in the Merchant Server's database. A fulfillment request 11, which includes the orderID and those ordered items to be fulfilled, is generated and sent to the merchant's fulfillment department. The fulfillment department's computer server, upon completion of order fulfillment, will generate a fulfillmentID 12, which may include the orderID and other delivery information, and send it back to the Merchant Server.

When the Merchant Server received the fulfillmentID 12, this fulfillmentID will also be stored in the corresponding orderID record, in the Merchant Server's database. An order-fulfilled response message 13b is generated, which includes orderID and the fulfilled order items, and is sent to the consumer, via email. And a payment capturing request 13a will be generated, which includes the transactionID and money amount, and is sent back to the Host of choice 3. Upon receiving the payment capturing request 13a, the Host will verify the money amount against data stored under the transactionID. If the money amount does not match, a payment-capturing-request-refused 14b message will be generated, together with the original payment capturing request 13a, and sent back to the Merchant Server. The Merchant Server can re-transmit the payment capturing request, after receiving the payment-capturing-request-refused message, and at the same time, send an alert with the record of this orderID to the system administrator for possible offline resolution if necessary.

If the money amount and transactionID are validated by the Host, before the record expires, the Host 3 will generate a transaction clearing request 14a, which includes the consumer's payment card number, money amount, and merchant's financial data for capturing payment, and send to the payment card issuer, via an Internet Payment Gateway, or a payment card clearing network. Upon receiving the transaction-clearing-request response 15 from the consumer's payment card issuer via payment gateway, the Host 3 will generate a payment-capturing-request response message 16, which includes the transactionID, and send it back to the Merchant Server who requested it. This completes this transaction and the record of this transactionID 14a,15 is archived in the Host's archive database.

The Merchant Server will store the payment-capturing-request response message 16 in the corresponding orderID record, for future reconciliation with its financial statements from merchant's financial institution.

Consumers or merchants can query the status of financial transactions of an order or orders they requested from the Host online. The Host stores the status of the payment-authorization-request, the status of payment-approval-request, and the status of payment-capturing-request in the member accessible website which the Host has set up. The orderID can be used as the memberID for login and query, and the login password can be an email address where results of the query will be sent. The status has a timestamp, and can be either in-progress, approved with transactionID, or rejected. Consumers can also query the status of order fulfillment online at merchant's website, which the merchant has set up to be accessible to its customers.

Description and Operation of Alternative Embodiment

Not applicable.

Conclusion, Ramifications and Scope of Invention

Accordingly, the reader will see several benefits of this ecommerce transaction process and method. Firstly, the consumer need not be afraid of shopping online because he or she is afraid of entering the payment card number online. In this transaction model, no payment card number is used by the buyer when he or she shops online. In case that a payment card number has been pirated, it is rendered useless when going online within this transaction model. The fact that payment card number does not travel online will prevent eavesdropping of the payment card numbers over the internet.

Another benefit to consumers in this online transaction process is that merchant do not handle consumer's payment card number, thus it alleviates the payment card abuse by fraudulent merchants.

An additional benefit is that this transaction process can be deployed over any communication protocols or communication networks. It has a further benefit that this transaction model is also complementary to the existing payment card network systems or payment gateways, that handle authorization and settlement of payment card payments.

While my above description contains many specificities, these should not be construed as limitations on the scope of this invention, but rather as an exemplification of one preferred embodiment thereof. Many other variations are possible.

For example that in a transaction involving ordered items from multiple sellers, paid by payment cards hosted at multiple trusted payment card hosts. The same transaction process and method can equally apply, and messages to and from the buyer are encrypted and can be queued.

Another example which in order to provide buyers a gradual transition experience from current practice that buyers must enter payment card number online in order to shop, a payment card number field can also be included in the pop up payment form, in addition to secret keys fields, which is to be completed by the buyer, before it is sent off to the trusted host for payment authorization. In such a case, the host need not to hash with the secret keys to obtain the payment card number, it is readily available in the payment form to be retrieved. Additionally, the secret keys do not have to be limited to dual pairs.

Accordingly, the scope of this invention should be determined not only by the embodiment(s) illustrated, but by the appended claims and their legal equivalents.

I claim:

[1. A method of engaging in electronic commerce, providing at least one host, at least one buyer, at least one seller, and at least one payment clearing processor, comprising:

(a) specifying by the buyer a host, and sending by the buyer an order for goods and services online to the seller, without sending payment card number along with said order, nor any number that is a reference to the payment card number;

(b) confirming by the seller said order with said buyer, and assigning by the seller an orderID for the order;

(c) authorizing by the buyer payment of said order by sending a payment authorization request and secret keys to said host with said orderID in a payment form;

(d) requesting by the seller for payment approval of the order from buyer's payment card issuer, through said host, by sending a message of a payment approval request to the host with said orderID;

(e) matching up by the host orderIDs received from the buyer and the seller, and content from the payment authorization request with the content from the payment approval request. wherein the payment authorization request and the payment approval request received by the host are matched over a time period determined by the host, detecting that the payment authorization request and payment approval request are not matched within the time period, and terminating the order by the host by expiring the payment approval request.]

[2. A method as recited in claim 1, wherein the buyer sending order for goods and services online to said seller further comprises sending, alongside said order, information of said host.]

[3. A method as recited in claim 1, wherein confirming by the seller said order to said buyer further comprises:

generating by the seller an unique orderID that identifies said order, and assigning the orderID to the order; and sending by the seller an independent payment form with said orderID to the buyer for completion.]

[4. A method as recited in claim 1, wherein authorizing by the buyer payment of said order further comprises:

completing by the buyer said payment form with said orderID, by filling in pertinent spaces with secret keys, and other optional data, the secret keys include at least one key for authentication, and another key for authorization;

sending by the buyer said completed payment form with said orderID directly to said host; and notifying by the buyer to the seller that payment form of said orderID is completed and sent.]

[5. A method as recited in claim 1, wherein requesting by the seller for payment approval of the order, from buyer's payment card issuer, through the host, further comprises:

constructing by the seller a message of payment approval request with said orderID, and sending directly to the host.]

[6. A method as recited in claim 1, wherein matching up orderID by the host further comprises:

searching by the host, for the payment form that has the exact same orderID as that of said payment approval request, or, searching for the payment approval request that has the exact same orderID as that of said payment form;

recovering by the host the secret keys sent by said buyer in the payment form with exact same said orderID;

hashing by the host with said secret keys to obtain the payment card number for paying the order of said orderID; and sending by the host a request for payment approval authorization, from said buyer's payment card issuer, with said payment card number, through the private payment clearing network or the internet payment gateway.]

[7. The method of claim 2, wherein the order is received via internet.]

[8. The method of claim 2, wherein the order is received in an encrypted form.]

[9. The method of claim 2, wherein the order ID is received via internet.]

[10. The method of claim 2, wherein the order ID is sent in an encrypted form.]

[11. The method of claim 2, wherein the communication between the at least one buyer and the host is via internet.]

[12. The method of claim 11, wherein the communication is encrypted.]

[13. The method of claim 2, wherein the communication between the at least one seller and the host is via internet.]

[14. The method of claim 13, wherein the communication is encrypted.]

[15. The method of claim 2, wherein the communication between the at least one seller and the at least one buyer is via internet.]

[16. The method of claim 1, wherein the communication is encrypted.]

17. A method for enabling a *buyer-seller* transaction *using a host*, *the buyer-seller transaction* comprising: *buyer orders, seller order IDs and buyer payment forms transmitted between a buyer and a seller; wherein the transaction further comprises:*

*at least one seller* receiving an order for one or more items from at least one buyer, without receiving a payment card number along with said order, nor any number that is a reference to the payment card number[, by at least one seller];

*the at least one seller* sending an order ID for the one or more items to the at least one buyer [by the at least one seller];

*the at least one seller* receiving [by the at least one seller] from the at least one buyer a payment form having the order ID for the one or more items; *and*

*wherein the host comprises a secure computer server that includes a repository of buyer payment card data and that communicates via the internet between a buyer web browser and at least one seller merchant server;*

*the method comprising:* receiving by a host *via the internet* from the at least one buyer *web browser* a payment authorization request comprising the order ID and secret keys for authorization of the payment of the one or more items to be paid by one or more payment cards chosen by the at least one buyer;

receiving by the host *via the internet* from the at least one seller *merchant server* a payment approval request having the order ID;

matching up by the host [orderIDs] *order IDs* received from the buyer and the seller, and content from the payment authorization request with the content from the payment approval request, wherein the payment authorization request and the payment approval request received by the host are matched over a time period determined by the host, detecting that the authorization request and payment approval request are not matched within the time period, and terminating the order by the host by expiring the payment approval request*; and*

*responsive to expiring the payment approval request, sending a payment-approval request-rejected response via the internet to the seller merchant server.*

18. The method of claim 17, wherein the *buyer* order further comprises [the] *an* indication of the *buyer-chosen* host [chosen by the at least one buyer].

19. The method of claim 17, wherein the *buyer* order further comprises one or more authentication codes for the one or more payment cards.

[20. The method of claim 17, further comprising sending by the at least one seller a response indicating the availability of the one or more items to the at least one buyer.]

[21. The method of claim 17, further comprising sending by the at least one seller a response accepting the order to the at least one buyer.]

[22. The method of claim 21, wherein the response further comprises availability and cost for the one or more items.]

[23. The method of claim 17, further comprising sending by the at least one buyer an order-cancelled response to the at least one seller to terminate the transaction.]

24. The method of claim 17, wherein the *buyer* payment form, [received by the at least one seller,] further comprises [the] *an* indication of the host chosen by the at least one buyer.

25. The method of claim 17, wherein the *buyer* payment form, [received by the at least one seller,] further comprises one or more authentication codes for the one or more payment cards.

26. The method of claim 17, wherein the *buyer* payment form, [received by the at least one seller,] further comprises one or more authorization codes for the one or more payment cards.

27. The method of claim 17, wherein the *buyer* payment [from] *form*, [received by the at least one seller,] further comprises a *buyer* cancellation message [for the at least one buyer to terminate] *terminating* the order.

28. The method of claim 17, further comprising *the host* setting up [with the host] *in said repository* one or more pairs of keys corresponding to the one or more *buyer* payment cards [by the at least one buyer].

29. The method of claim 28, wherein each pair of the one or more pairs of keys further comprises an authorization code.

30. The method of claim 28, wherein each pair of the one or more pairs of keys further comprises an authentication code.

31. The method of claim 28, wherein *the host, responsive to the at least one buyer, changes* the one or more pairs of keys [are changed by the at least one buyer].

32. The method of claim 28, wherein *the host changes* the one or more pairs of keys [are changed] periodically.

33. The method of claim 17, wherein the payment authorization request, received by the host, further comprises one or more authorization codes for the one or more payment cards.

34. The method of claim 17, wherein the payment authorization request, received by the host, further comprises one or more authentication codes for the one or more payment cards.

35. The method of claim 17, *wherein the transaction* further [comprising sending by the at least one buyer to the at least one seller] *comprises* a *buyer notification* message indicating that the payment authorization request has been sent to the host.

36. The method of claim 17, wherein the payment approval request, received by the host, further comprises one or more authentication codes for the one or more payment cards.

37. The method of claim 17, wherein the payment approval request, received by the host, further comprises merchant ID for the at least one seller in order to receive payment from the one or more payment sources.

38. The method of claim 17, wherein the payment approval request, received by the host, further comprises names and addresses of one or more financial institutes for the at least one seller in order to receive payment from the one or more payment sources.

39. The method of claim 17, wherein the payment approval request, received by the host, further comprises the total cost for the one or more items.

[40. The method of claim 24, further comprises matching by the host payment authorization request comprises one or more authorization codes for one or more pairs of keys required for paying the one or more items by the one or more payment cards.]

[41. The method of claim 24, wherein the content received from the payment approval request comprises one or more authentication codes for one or more pairs of keys required for paying the one or more items by the one or more payment cards.]

42. The method of claim 24, further comprising matching by the host an authorization code received from the payment authorization request with an authentication code received from the payment approval request, wherein the authorization code and the authentication code are designed for the payment of the one or more items by the one or more payment cards.

43. The method of claim 24, wherein the payment authorization request and the payment approval request received by the host are received and matched in order to locate information of the one or more payment cards and retrieve the card numbers of the one or more payment cards.

[44. The method of claim 24, wherein the transaction is terminated and a message is sent to the at least one buyer to reject the payment approval request.]

45. A method for enabling *a* transaction[, comprising] *using a host, wherein the transaction comprises*:

*at least one buyer* setting up with a host one or more pairs of keys corresponding to one or more payment cards [by at least one buyer];

*at least one seller* receiving an order for one or more items from the at least one buyer, without receiving a payment card number along with said order, nor any number that is a reference to the payment card number [by at least one seller];

*the at least one seller* sending an order ID for the one or more items to the at least one buyer [by the at least one seller];

*the at least one seller* receiving [by the at least one seller] from the at least one buyer a payment form having the order ID for the one or more items; *and*

*wherein the host comprises a secure computer server that includes a repository of buyer payment card data and that communicates via the internet between a buyer web browser and at least one seller merchant server;*

*the method comprising:* receiving by a host *via the internet* from the at least one buyer *web browser* a payment authorization request comprising the order ID and one of said key pairs for authorization of the payment of the one or more items to be paid by one or more payment cards chosen by the at least one buyer;

receiving by the host *via the internet* from the at least one seller *merchant server* a payment approval request having the order ID;

matching up by the host [orderIDs] *order IDs* received from the buyer and the seller, and content from the payment authorization request with the content from the payment approval request, wherein the payment authorization request and the payment approval request received by the host are matched over a time period determined by the host[,]*;* detecting that the authorization request and payment approval request are not matched within the time period[, and]*;* terminating, *in response to such detection,* the order by the host by expiring the payment approval request*; and*

*responsive to expiring the payment approval request, sending a payment-approval request-rejected response via the internet to the seller merchant server.*

*46. The method of claim 17 wherein the host maintains pools of payment authorization requests; and said matching step comprising searching inside the pool of payment authorization requests that were received within a time window around the time that the payment approval request was received.*

*47. The method of claim 45 wherein the host maintains pools of payment authorization requests; and said matching step comprising searching inside the pool of payment authorization requests that were received within a time window around the time that the payment approval request was received.*

* * * * *